(12) United States Patent
Nelson et al.

(10) Patent No.: US 7,610,563 B2
(45) Date of Patent: *Oct. 27, 2009

(54) SYSTEM AND METHOD FOR CONTROLLING THE DISPLAY OF NON-UNIFORM GRAPHICAL OBJECTS

(75) Inventors: Lester D. Nelson, Santa Clara, CA (US);
Elizabeth F. Churchill, San Francisco, CA (US); David N. Snowdon, Grenoble (FR); Laurent Denoue, Palo Alto, CA (US)

(73) Assignees: Fuji Xerox Co., Ltd., Tokyo (JP); Xerox Corporation, Stamford, CT (US)

( * ) Notice: Subject to any disclaimer, the term of this patent is extended or adjusted under 35 U.S.C. 154(b) by 319 days.

This patent is subject to a terminal disclaimer.

(21) Appl. No.: 10/104,081

(22) Filed: Mar. 22, 2002

(65) Prior Publication Data

US 2003/0179234 A1      Sep. 25, 2003

(51) Int. Cl.
G06F 13/00      (2006.01)
G06F 15/00      (2006.01)

(52) U.S. Cl. ..................... 715/839; 715/838

(58) Field of Classification Search .......... 345/763, 345/764, 765, 419, 619, 156–158, 653; 715/808, 715/804, 850, 764–770, 803, 782, 785, 838, 715/839, 842, 853, 848, 840, 852, 762–765
See application file for complete search history.

(56) References Cited

U.S. PATENT DOCUMENTS

| | | | | |
|---|---|---|---|---|
| 5,396,590 A | * | 3/1995 | Kreegar | 345/808 |
| 5,602,564 A | * | 2/1997 | Iwamura et al. | 715/782 |
| 5,633,994 A | * | 5/1997 | Kaizuka | 345/419 |
| 5,695,346 A | * | 12/1997 | Sekiguchi et al. | 434/365 |
| 5,732,230 A | * | 3/1998 | Cullen et al. | 715/764 |
| 5,894,308 A | | 4/1999 | Isaacs | |
| 5,956,736 A | * | 9/1999 | Hanson et al. | 715/513 |
| 5,986,670 A | * | 11/1999 | Dries et al. | 345/629 |
| 6,061,067 A | | 5/2000 | Silva | |
| 6,243,075 B1 | * | 6/2001 | Fishkin et al. | 345/156 |
| 6,243,093 B1 | | 6/2001 | Czerwinski | |
| 6,386,985 B1 | * | 5/2002 | Rackham | 472/75 |
| 6,512,515 B1 | | 1/2003 | Smith | |
| 6,549,199 B1 | * | 4/2003 | Carter et al. | 345/418 |
| 6,714,201 B1 | * | 3/2004 | Grinstein et al. | 345/474 |

(Continued)

OTHER PUBLICATIONS

Beaudouin-Lafon, M., "Novel Interaction Techniques for Overlapping Windows," UIST 2001, CHI Letters 3(2): 153-154, Nov. 2001.

(Continued)

*Primary Examiner*—Kevin Nguyen
(74) *Attorney, Agent, or Firm*—Fliesler Meyer LLP

(57) ABSTRACT

A Graphical User Interface ("GUI") that provides a user with the ability to manipulate display objects in a non-uniform manner on a display surface is provided. For example, a user can manipulate an object so that it appears, torn, bent, folded, angled, etc. Additionally, a method and system for digitally attaching display objects to a display surface is described. The attachments include digital staples, digital push-pins, digital tape, etc. In still another aspect of the present invention a technique for transmitting and updating the display of non-uniform objects is described.

20 Claims, 17 Drawing Sheets

U.S. PATENT DOCUMENTS

| | | | |
|---|---|---|---|
| 6,765,567 | B1 | 7/2004 | Roberson |
| 6,768,497 | B2 | 7/2004 | Baar |
| 6,828,963 | B1 | 12/2004 | Rappoport |
| 6,924,822 | B2 * | 8/2005 | Card et al. .................. 345/660 |
| 2002/0052925 | A1 * | 5/2002 | Kim et al. .................. 709/217 |
| 2003/0050915 | A1 * | 3/2003 | Allemang et al. .............. 707/1 |

OTHER PUBLICATIONS

Bederson, B. and Hollan, J., "Pad++: A Zoomable Graphical Interface System," Proceedings of CHI'95, May 1995.

Bier, E., Stone, M., Pier, K., Buxton, W. and DeRose, T., "Toolglass and Magic Lenses: The See-Through Interface," Proceedings of SIGGRAPH '93, pp. 73-80, 1993.

Bell, B. and Feiner, S., "Dynamic Space Management for User Interfaces," In Proceedings of UIST2000, pp. 239-248, 2000.

Bly, S. and Rosenberg, J., "A Comparison of Tiled and Overlapping Windows," CHI'86 Proceedings, Association for Computing Machinery, ACM 0-89791-180-6/86/0400-010, pp. 101-106, Apr. 1986.

Churchill, E., Nelson, L. and Sokoler, T., "TackTale Study—Detailed Interview Notes," Aug. 2001.

Furnas, G., "Generalized Fisheye Views," Proceedings of CHI'86, (Boston, MA, Apr. 1986), pp. 16-23, Apr. 1986.

Kandogan, E., and Shneiderman, B., "Elastic Windows: Evaluation of Multi-Window Operations," ACM SIGCHI 97 Conference on Human Factors in Computing Systems, 1997.

Lemmons, P. "(1983b) Microsoft Windows, A mouse with modest requirements," Byte, 8(12), Dec. 1983.

Mander, R., Salomon, G., and Wong, Y., "A 'Pile' Metaphor for Supporting Casual Organizing of Information," Proceedings of CHI'92, pp. 627-634, 1992.

Robertson, G., Czerwinski, M., Larson, K., Robbins, D., Thiel., D., and van Dantzich, M. (1998), "Data Mountain: using spatial memory for document management." In proceedings of CHI'98, 1998.

Robertson, G., van Dantzich, M., Robbins, D., Czerwinski, M., Hinckley, K., Risden, K., Thiel, D. and Gorokhovsky, V. (2000), "The Task Gallery: A 3D Window Manager," In Proceedings of the CHI'2000, 494-501, 2000.

Rose, D., Mander, R., Oren, T., Ponceleon, D., Saloon, G., and Wong, Y., "Content Awareness in a File System Interface: Implementing the 'Pile' Metaphor for Organizing Information," SIGIR'93, pp. 260-269, 1993.

Scheifler, R., Gettys, J., and Newman, R., "X Window System," Digital Press, Bedford MA 1988.

Smith, D., Harslem, E., Irby., C., and Kimball, R. (1982a), "The Star user interface: an overview," Proceedings of the 1982 National Computer Conference, 1982.

Card, S., Robertson, G., and York, W. (1996), "The WebBook and the Web Forager: Video Use Scenarios for a World-Wide Web Information Workspace," In Proceedings of the CHI'1996.

Churchill, Elizabeth F., et al., Editors, "Collaborative Virtual Environments: Digital Places and Spaces for Interaction," 2001, Springer-Verlag.

* cited by examiner

SYSTEM AND METHOD FOR CONTROLLING THE DISPLAY OF NON-UNIFORM GRAPHICAL OBJECTS

CROSS REFERENCE TO RELATED APPLICATION

The following United States patent is assigned to the assignee of the present application, and its disclosure is incorporated herein by reference:

U.S. patent application Ser. No. 10/104,850 filed Mar. 22, 2002, entitled "SYSTEM AND METHOD FOR ARRANGING, MANIPULATING AND DISPLAYING OBJECTS IN A GRAPHICAL USER INTERFACE," by Lester D. Nelson, et al., issued Jul. 24, 2007 as U.S. Pat. No. 7,249,327.

FIELD OF THE INVENTION

The present invention generally relates to the display of information in a Graphical User Interface ("GUI"), and more particularly to a system and method for arranging, manipulating, and displaying objects in a GUI.

BACKGROUND

The use of computer systems and software programs to obtain, view, manipulate, and otherwise manage information has become an aspect of every day life. Due to limited display area, there has been an increasing desire to better organize and display information within a confined display area. Current techniques for organizing the display of information, and to generally simplify the use of computer programs in general, are frequently referred to as a Graphical User Interface ("GUI"). Current GUIs typically utilize some type of control device, such as a mouse, or touch sensitive screen, to manipulate text, images, and other objects on a display screen. These objects may include icons, windows, menus, and other images which are frequently displayed through the use of computer programs.

A common characteristic of typical GUI's is the implicit design assumption of arranging display elements (windows, panes in window, objects in panes, icons, etc.) with a regularity that is easily accomplished in a digital system. For example, FIG. 1A and FIG. 1B illustrate the even boundaries 101, 102, 103, 104, 105, common orientations, and static behaviors of windows 110, 111, 112, 113, 114, 115, 116 common to both the tiled (FIG. 1A) and overlapped (FIG. 1B) versions of the same GUI. FIG. 2 illustrates a typical desktop GUI 200 with several icons $201_n$, and windows $202_n$, each of which are displayed with an implicit regularity.

Recent GUI techniques have been defined to take advantage of the physical arrangement of objects, such as the 'pile' metaphor. However, even these techniques, which arrange objects in neat and orderly piles, still exhibit the regularity typically found in other GUIs.

Some GUI techniques take advantage of the empty space on a screen to position windows so that they do not overlap. For example, Dynamic Space Management includes a window manager which finds the closest empty space to the original destination at which the dragged window can be dropped and avoids overlap by automatically moving the dragged window to this empty space. In a variation of this approach, the dragged window remains at its selected destination, but windows that overlap are automatically moved to the nearest available empty spaces.

Still other GUIs represent objects in a three dimensional graphical environment. Users may explicitly manipulate the objects and manipulations persist within the virtual environment. However, where information displays, such as two-dimensional document artifacts, are embedded in such environments, the various (flat) image surfaces each reflect the basic desktop GUI. For example, FIGS. 3A, 3B, and 3C illustrate three different GUIs of Microsoft's TaskGallery™. As seen, each GUI uses a similar approach to lay out standard windows in a three-dimensional environment.

With respect to FIG. 3A, the windows $301_n$ and icons $302_n$ are arranged on a palette 303 so that some objects appear to be farther away than others. Similarly, in FIG. 3B, windows $304_n$ are arranged in an overlapping configuration on stands 305, 306, 307. FIG. 3C illustrates an expanded view when one of the windows 304 (FIG. 3B), such as window 307, has been selected by a user for viewing.

Another example of a three-dimensional GUI is the Three-Dimensional Workspace Manager 400 (http://www.3dwm.org) illustrated in FIG. 4. The GUI program illustrated in FIG. 4 maps remote desktops 401, 402, 403 into three-dimensional space, but it does not have the capability of mapping individual windows into the three-dimensional space. As described with respect to other GUIs, the Three-Dimensional Workspace Manager 400 displays the windows as squares mapped onto three-dimensional planes.

FIG. 5A illustrates yet another example of a three-dimensional GUI, known as Web Forager 500, provided by Xerox Palo Alto Research Center ("Xerox PARC"). Web Forager 400 utilizes a book metaphor: instead of scrolling through windows, users can flip pages that are mapped into the three-dimensional space as if they were using a book 501. Again, Web Forager illustrates all objects will regularity, such as, squares, rectangles, etc.

Another GUI provided for document management, known as Data Mountain 510, is illustrated in FIG. 5B. Data Mountain 510 allows a user to place document thumbnails $511_n$ at arbitrary positions on an inclined plane 512 in a three-dimensional desktop virtual environment using a two-dimensional interaction technique. Data Mountain 510 allows users to move document thumbnails $511_n$ between existing thumbnails. When a thumbnail is being moved, other thumbnails are moved out of the way, yet the user still sees visual cues indicating where every thumbnail will be when the movement is completed.

One of the drawbacks of currently existing GUIs, such as the ones described above, is that the each have the implicit design assumption of arranging display objects with regularity: tiled, windowed, squares, rectangles, etc. Accordingly, it would be an advancement in the art to provide a system and method which allows objects to be arranged, displayed, and manipulated in a non-uniform manner.

SUMMARY

Roughly described, the present invention provides a method for displaying, on a display surface, a non-uniform graphical image representative of a display object. The method comprises the steps of obtaining a display object, generating a graphical image representative of the display object, modifying the graphical image, and displaying the transformed graphical image. The described method provides the ability to update and display objects in a non-uniform manner.

According to another aspect of the invention, a method for updating a display, on a display surface, of a graphical image representative of a display object is provided. The method includes the steps of receiving an input comprised in a first graphical image, generating a second graphical image responsive to the input, removing from a display surface the first graphical image, wherein the display surface is representative of a display object, and displaying the second graphical image responsive to the step of removing.

BRIEF DESCRIPTION OF THE DRAWINGS

The invention will be described with respect to the particular embodiments thereof. Other objects, features, and advantages of the invention will become apparent with reference to the specification and drawings in which.

DETAILED DESCRIPTION

Embodiments of the present invention provide a system and method for displaying, arranging and manipulating objects in a non-uniform manner through the use of a GUI. In accordance with the discussion herein, an "object" is defined as a window, icon, image, or any other viewable image which may be displayed. A "group" as defined herein may be any arrangement or combination of a plurality of objects which may be manipulated together.

System Overview

In one embodiment, the present invention comprises a computer program which is designed to operate by layering the program over an existing GUI. For example, the program may be configured to function within Microsoft Windows. Other embodiments may be implemented by modifying an existing GUI's "graphical toolkit." Alternatively, a standalone program may be incorporated to run with an existing GUI, thereby implementing other embodiments of the present invention. It will be understood that all variations and embodiments of the present invention may be configured to function over a network, such as the Internet, in communication with multiple applications, computers, and/or GUIs thereby operating on multiple computers.

Figure 1A:
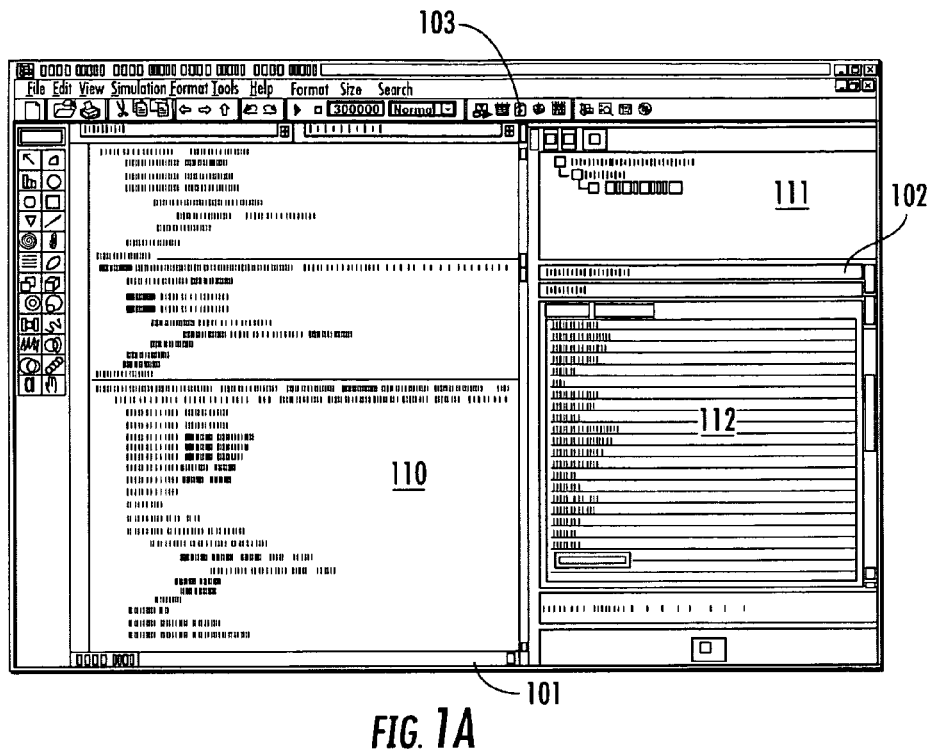
FIG. 1A Illustrates a typical tiled GUI.
Figure 1B:
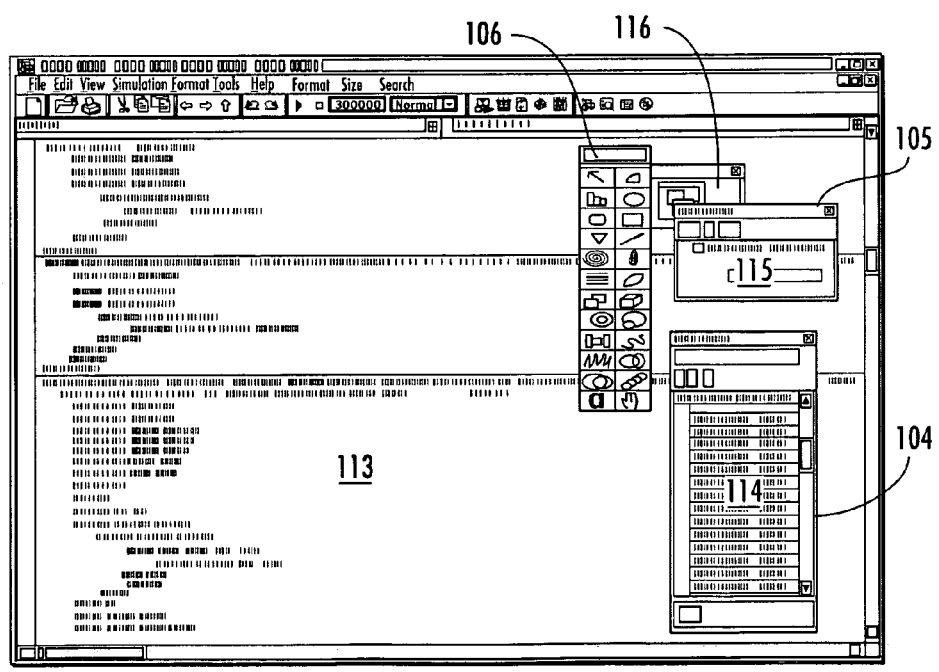
FIG. 1B Illustrates a typical windowed GUI.
Figure 2:
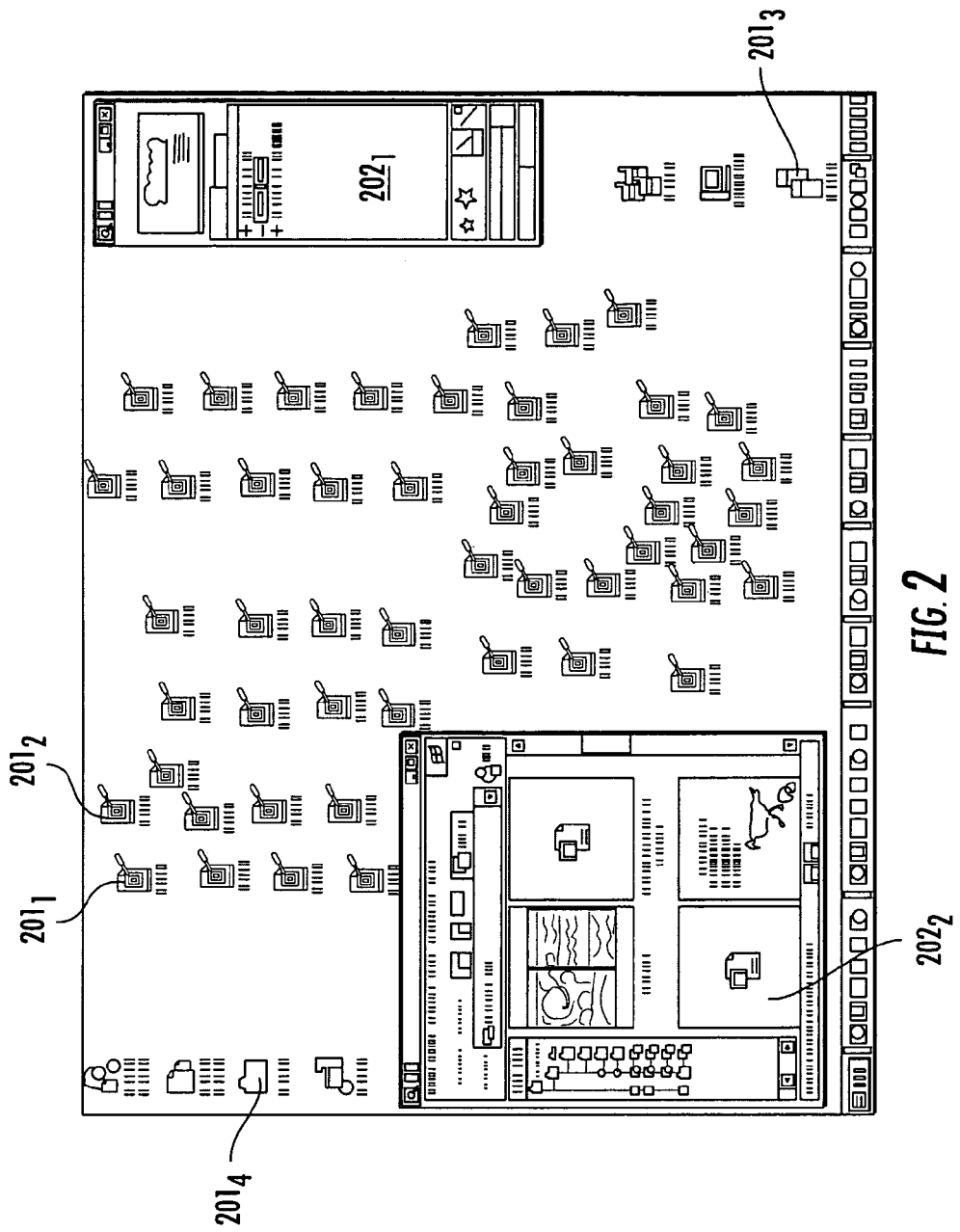
FIG. 2 illustrates a typical desktop GUI.
Figure 3A:
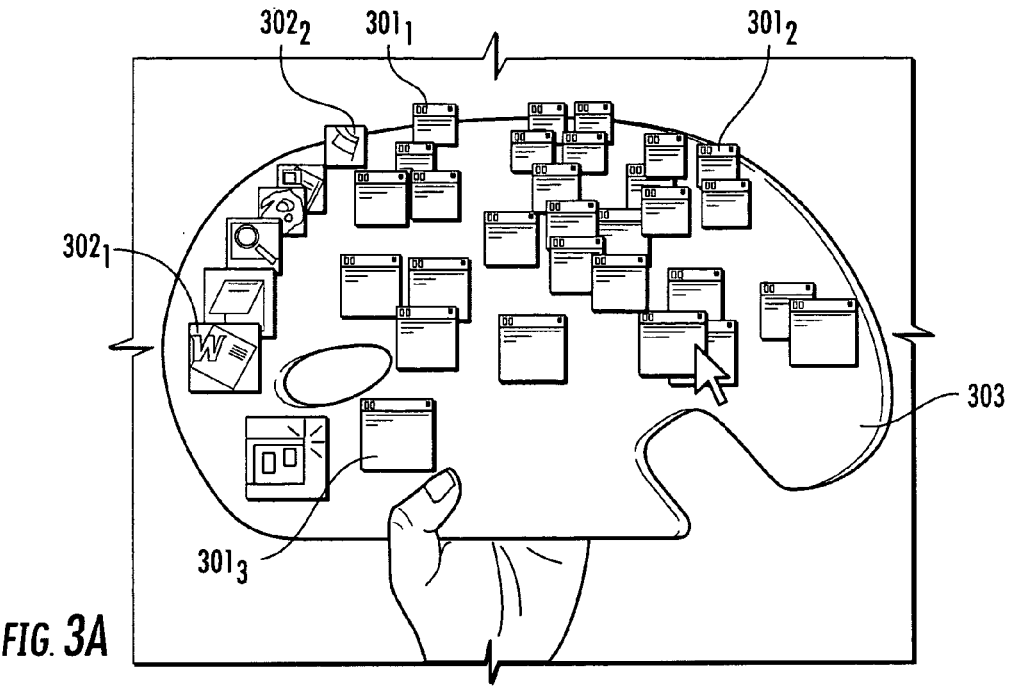
FIGS. 3A-3C illustrated different GUIs provided by Microsoft's Task Gallery™.
Figure 3B:
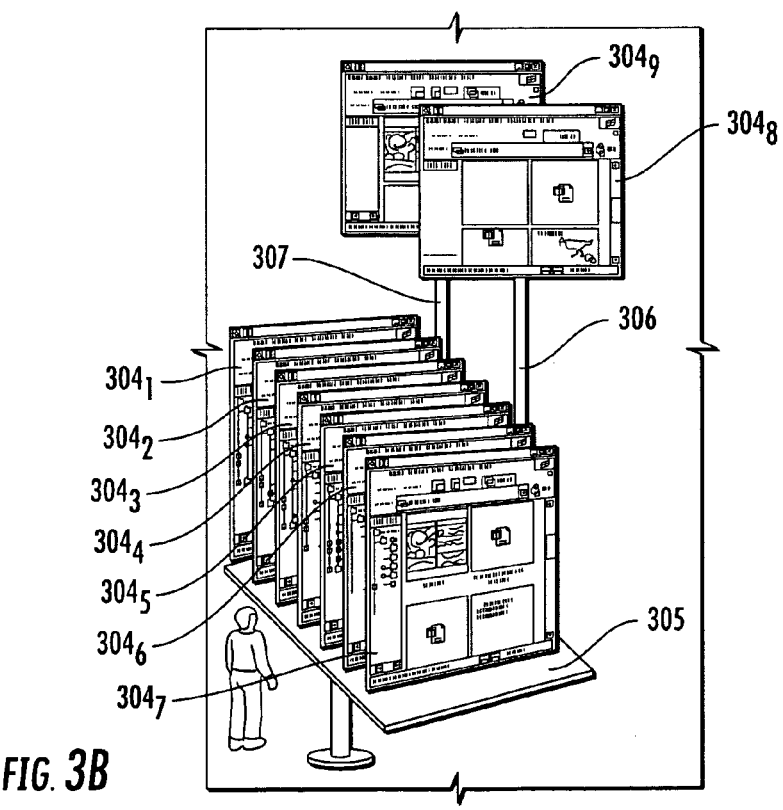
Figure 3C:
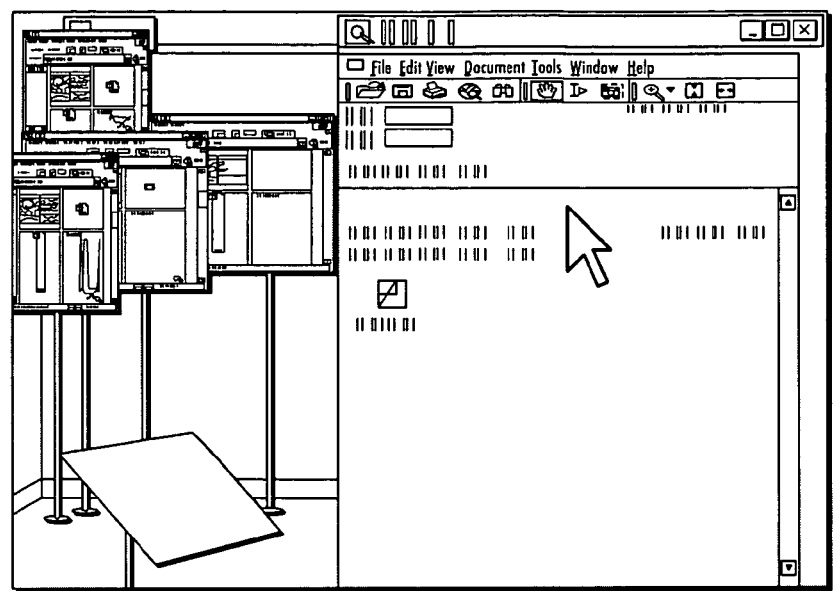
Figure 4:
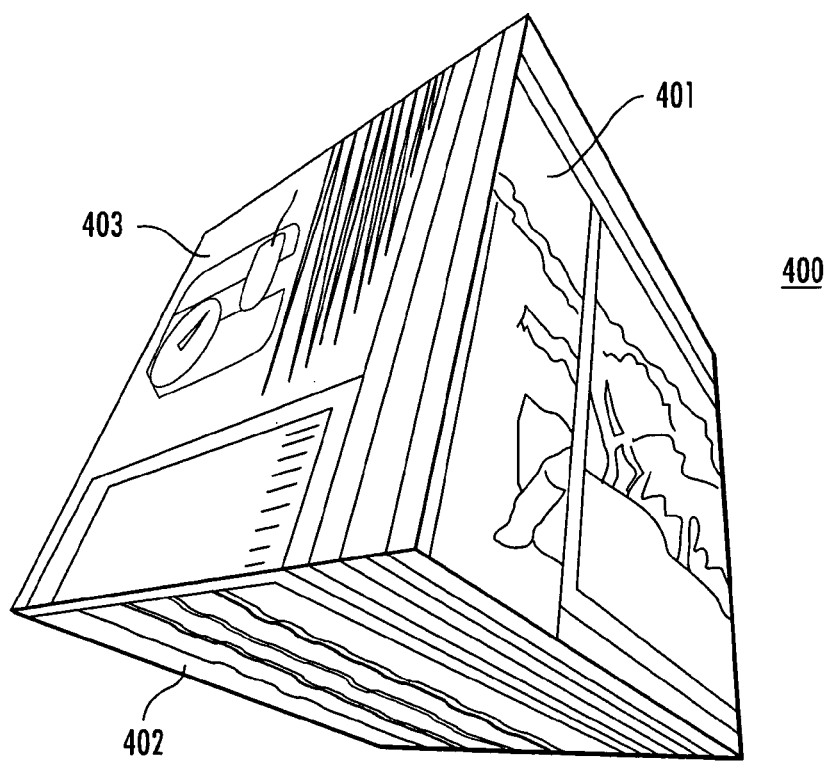
FIG. 4 illustrates a typical three-dimensional GUI.
Figure 5A:
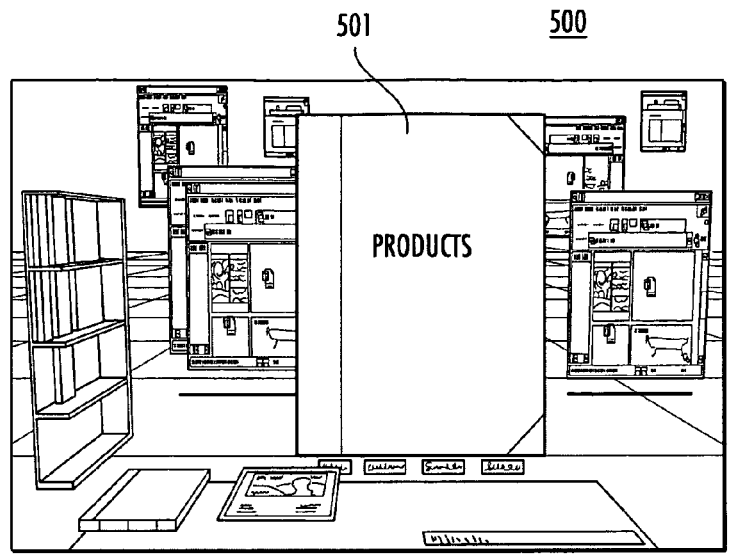
FIG. 5A illustrates another example of a typical three dimensional GUI.
Figure 5B:
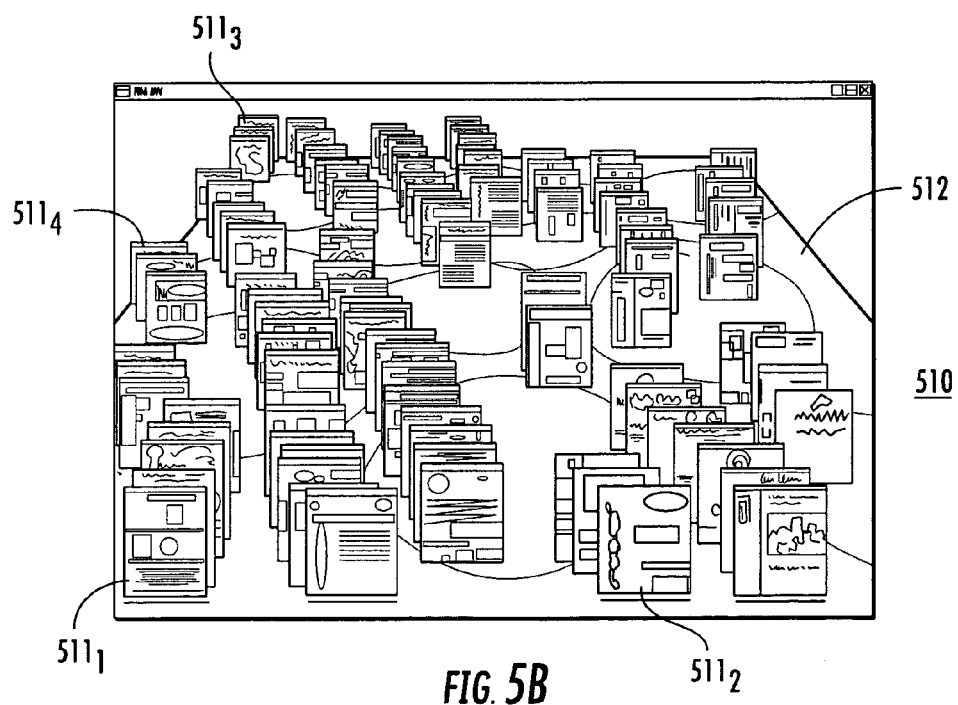
FIG. 5B illustrates a typical GUI.
Figure 6:
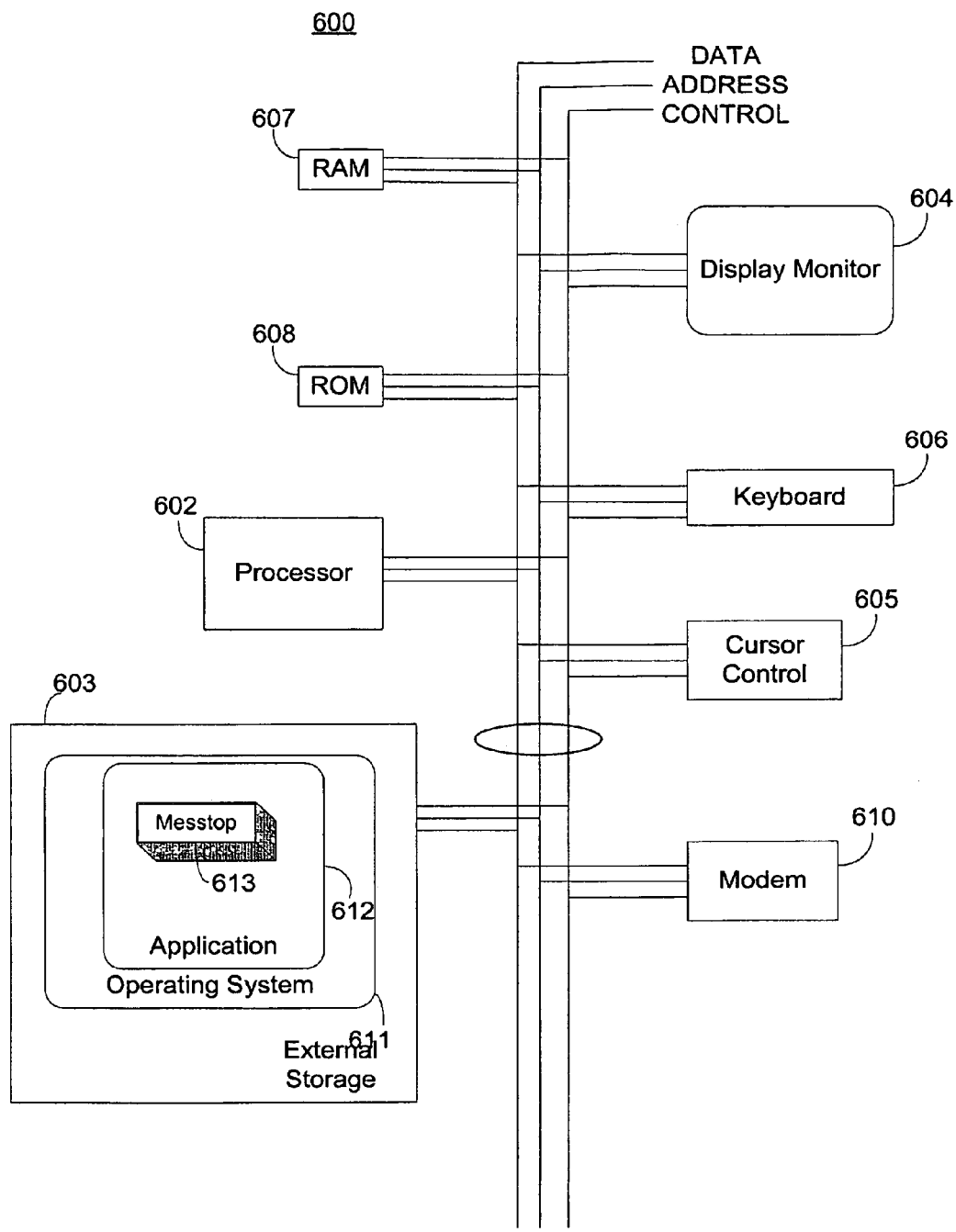
FIG. 6 is a block diagram of a general purpose computer architecture capable of implementing various embodiments of the present invention.

FIG. 6 illustrates a general purpose computer architecture 600 suitable for implementing embodiments of the present invention. The general purpose computer 600 includes at least a processor 602, a display 604, and a cursor control device 605. The cursor control device 605 can be implemented as a mouse, a joy stick, a series of buttons, a touch-sensitive screen, or any other input device which allows a user to control the position of a cursor or pointer on the display 604. The general purpose computer may also include random access memory 607, external storage 603, ROM memory 608, a keyboard 606, and a modem 610.

External storage 603 may include an operating system 611, such as Microsoft Windows, which is capable of executing programs, and applications 612, such as e-mail applications, newsgroups, Internet applications, etc. and may include a GUI.

In an embodiment, the present invention is configured as a software program 613 (sometimes referred to herein as "Messtop") which, according to different embodiments, is capable of functioning with an existing GUI, by modifying an existing GUI's toolkit, or as a standalone configuration.

As will be understood, embodiments of the present invention, such as Messtop software program 613, may be in the form of a software program, a software object, a software function, a software subroutine, a software method, a software instance, a code fragment, a hardware operation or user operation, singly or in combination.

Embodiments of the present invention are thus executable on any general purpose computing architecture such as the general purpose computer 600 of FIG. 6, but there is clearly no limitation that this architecture is the only one which can be used in implementing embodiments of the present invention.

Overview

Figure 7:
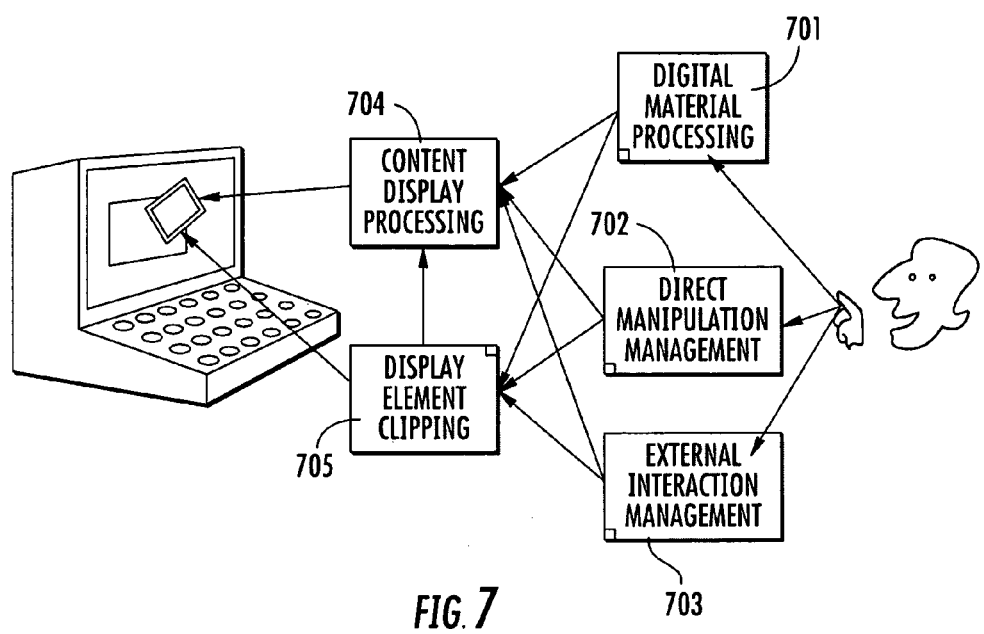
FIG. 7 is a block diagram illustrating various capabilities of an embodiment of the present invention.

FIG. 7 illustrates a number of capabilities of various embodiments of the present invention. Each of these capabilities will be described in more detail below along with a number of different implementations that support these capabilities. Included in these capabilities is digital material processing 701, direct manipulation management 702, external interaction management 703, content display processing 704, and display element clipping 705.

Display object clipping 705 provides the ability to clip regions of an object in a non-uniform manner. The technique of clipping digital display objects to a clipping polygon is well understood. For example, the Java™ 2 platform, Std. Ed. Version 1.3.1, defines clipping regions with a variety of shape definitions, including polygons, rectangles, geometric paths constructed from straight lines and curves, and device independent specifications from an arbitrarily-shaped area. Accordingly, the technique of display element clipping will not be described in further detail herein.

Clipping is applied to objects based on dynamic user input or other dynamic processes, such as simulation programs or other autonomous agents (such as network updates on a displayed object). The clipping regions may be saved in permanent storage along with the clipped object to provide persistently displayed digital objects. Alternatively, the clipping regions may be temporarily applied to display elements that are part of the currently-viewed display and maybe modified or removed entirely to allow display elements to resume their original shapes.

Content display processing 704 provides the ability to transform the visual appearance of display objects in a variety of ways. The technique for transforming the visual appearance of displayed objects is well understood (e.g., Adobe Photo Shop). Accordingly, the techniques for transforming the visual appearance of objects will not be described in detail herein.

According to an embodiment of the invention, image transformations are used in conjunction with interaction capabilities, such as clipping, digital material processing 701, direct manipulation management 702, and external interaction management 703, as will be described in detail below to perform various features and capabilities of the present invention. These image transformations may be applied based on dynamic user input or other dynamic processes, such as simultaneous programs or other autonomous agents.

Examples of image transformations include, but are not limited to, automatic border removal, bulge, contrast, curl page, cut, cut and paste, edge detection, edge enhancement, fish eye, holes, increased/decreased colors, invert, mesa, mosaic, radial, rectangular, reflowing, rotate by degree, segmentation, shading, shadowing, sharpen, stretching and shrinking, tile, transition effects, transparency, vortex, warping, wave, and zoom.

Direct Manipulation Management

One example of direct manipulation management 702 is the creation of irregular, non-uniform edges on a displayed object. Creation of irregular edges includes displaying objects with an appearance of rough-edged material, torn edges, edges that have been lifted off the posting surface, etc.

Figure 8A:
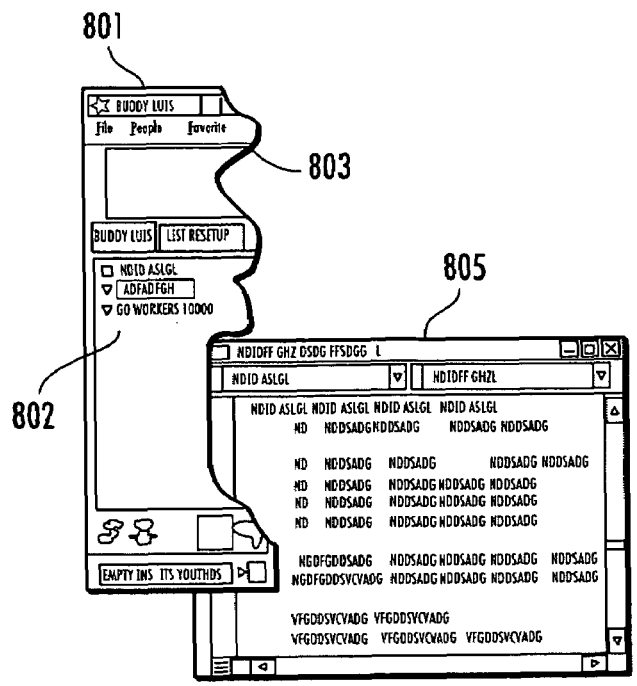
FIG. 8A illustrates an object with a rough or torn edge, according to an embodiment of the present invention.

An object with a rough or torn edge is formed by clipping the object along a geometric path and applying transformation such as edge detection and enhancement, and shadow generation. An example of an object with a rough or torn edge is illustrated in FIG. 8A. In FIG. 8A, object 801 includes a buddy list 802. Object 801 has been "torn" and represented with an irregular edge 803. By not displaying a portion of object 801 (often an un-important portion), another object 805 which includes other information may be simultaneously viewed.

User interactions that result in an object appearing as torn or with a rough edge 803 include dragging a mouse or other pointing input device along a path, clicking a path or other pointing input device at predefined or user-selected cut points, selection of a rough-edged or torn material (that then acts as a visual mask or template for the display object), selection of a segmentation algorithm such as a white space detection that specifies a rough edge, or selection from a set of predefined randomly-generated masks.

Figure 8B:
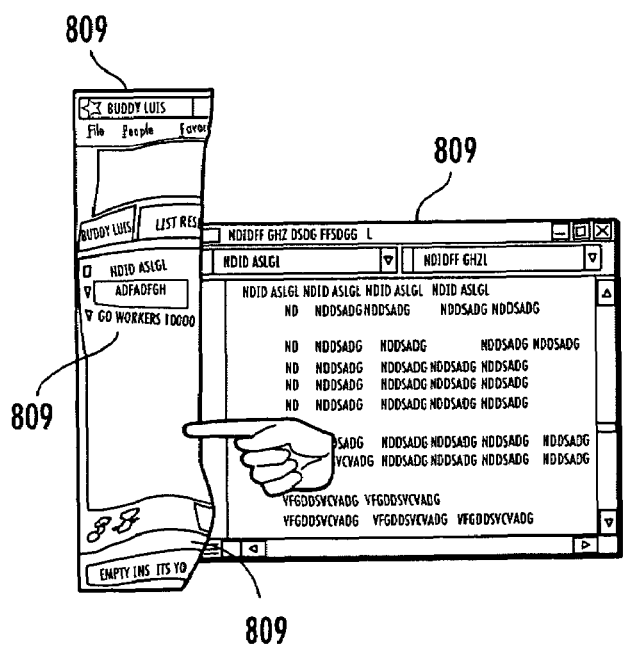
FIG. 8B illustrates an object with a lifted edge, according to an embodiment of the present invention.

FIG. 8B illustrates an example of an object 809 with a lifted edge 807. Displaying object 809 with a lifted edge 807 may be formed by clipping object 809 along a geometric shape (curve, polygon, etc.) and applying a transformation such as content warping, edge detection and enhancement, and shadow generation. Object 809 may include important information, such as a buddy list 810. Object 809 is displayed as being lifted up from a window 811, thereby displaying the content of window 811 and the object 809 with the buddy list 810 simultaneously.

User interactions that result in an object appearing with a lifted edge include dragging a mouse or other pointing input device in a gesture (e.g., inward from an edge, corner, or any designated lifting point or user interface control designed for that purpose), or selection of a predefined animation algorithm that effects a lifting transformation.

Deformable Objects

According to an embodiment of the invention, objects may be assigned different properties. Each property may in turn change its form according to some basic rules. For example, objects may have a property of being tearable, as described above, foldable, or manipulated in some other three-dimensional property including buckling, rolling, folding, etc. Additionally, objects may be assigned properties common to physical materials (e.g.: metal, wood glass, etc.). If an object is assigned a physical property such as metal, it may be manipulated as metal is manipulated (e.g.: bending, folding, etc.)

Buckling may be expressed digitally in a similar manner as lifting. Representing a buckled display object is performed by clipping along a geometric shape and applying transformations that include content warping (e.g., wave functions), edge detection and enhancement, and shadow generation.

Figure 9:
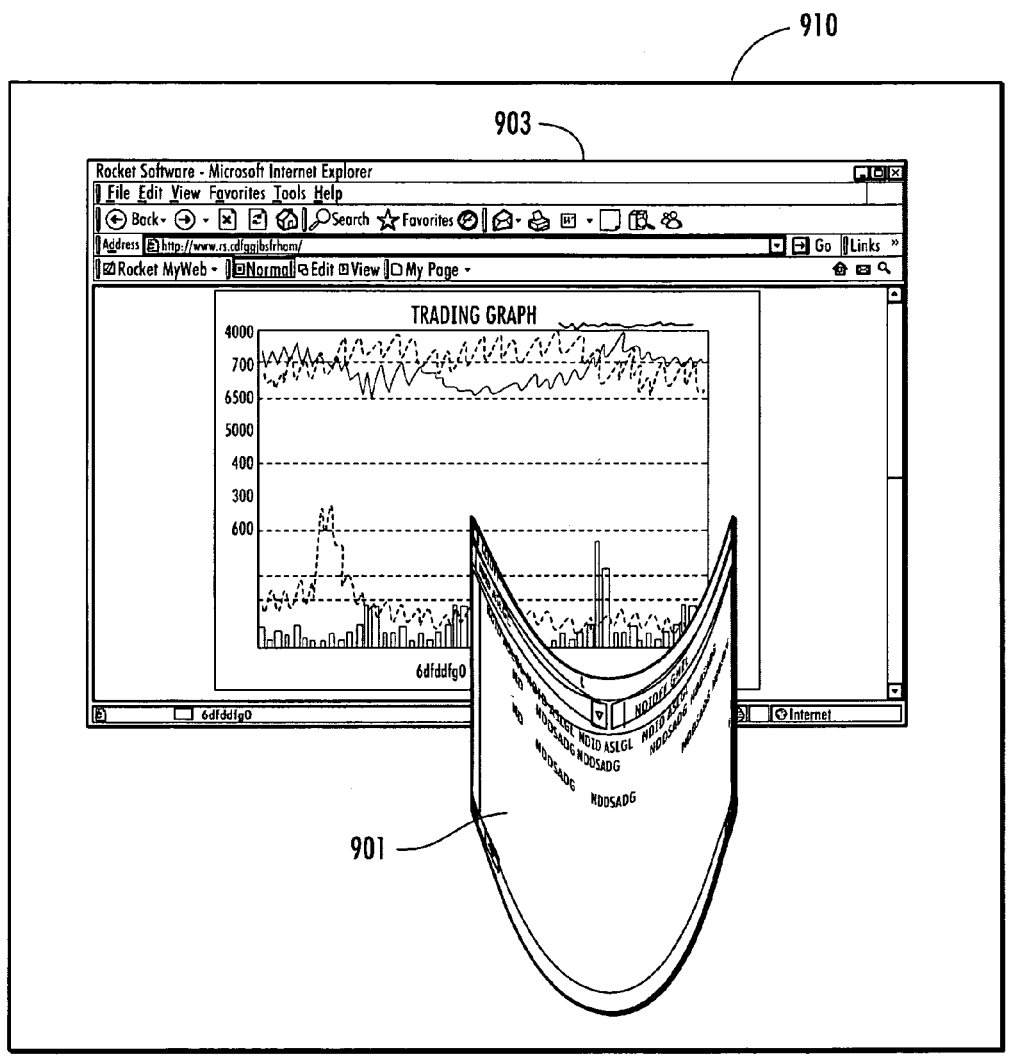
FIG. 9 illustrates an example of a buckled object, according to an embodiment of the present invention.

FIG. 9 illustrates an example of a buckled object 901 displayed along with a regular object 903. Buckling object 901 provides the ability to view a larger portion of object 903 within a confined display area 910.

User interactions that result in an object being displayed as buckled include dragging a mouse or other pointing input device in a gesture (e.g. poking an element from an edge corner or any designated lifting point or user interface control designated for that purpose) or selection of of a predefined algorithm that effects a lifting transformation.

Object Orientation

Figure 10:
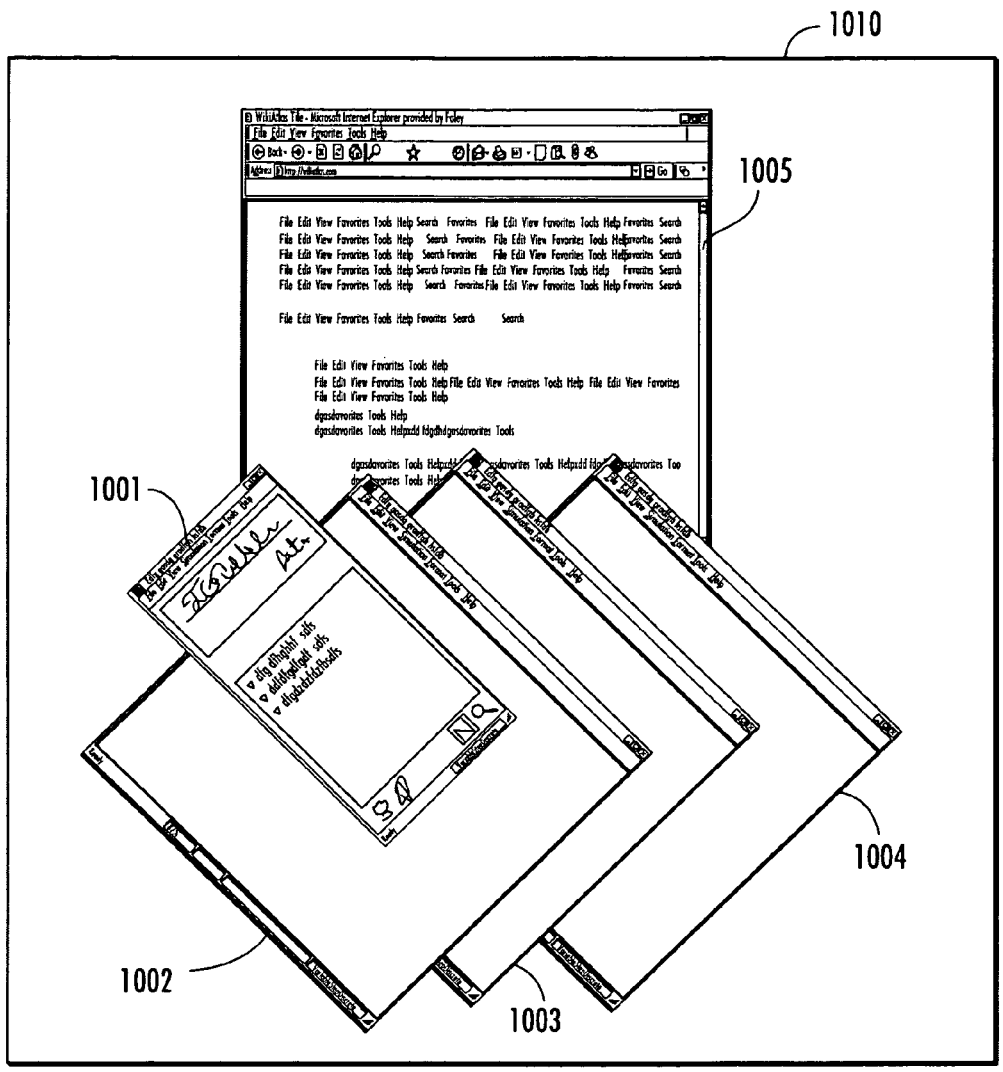
FIG. 10 illustrates a plurality of angled objects, according to an embodiment of the present invention.

FIG. 10 illustrates a display of a plurality of objects 1001, 1002, 1003 and 1004 displayed in an angled overlap format. FIG. 10 illustrates object 1001, which includes a buddy list, a set of objects 1002, 1003 and 1004, each displaying help files, and a window of work content 1005. This technique gives a partial view to each of the materials within a confined display area 1010. The individual objects are easily distinguished one from the other, and from other materials at different angles.

User interactions that result in objects being displayed at an angled orientation include dragging a mouse or other pointing input device in a circular gesture about a point, clicking a mouse or other pointing input device at a predefined or user-selected rotation points, numeric selection of an angle, and selection from a set of predefined or randomly-generated orientations.

Folded Display Objects

Creation of folded edges includes display objects that already have folds or are interactively folded, as described above.

Figure 11:
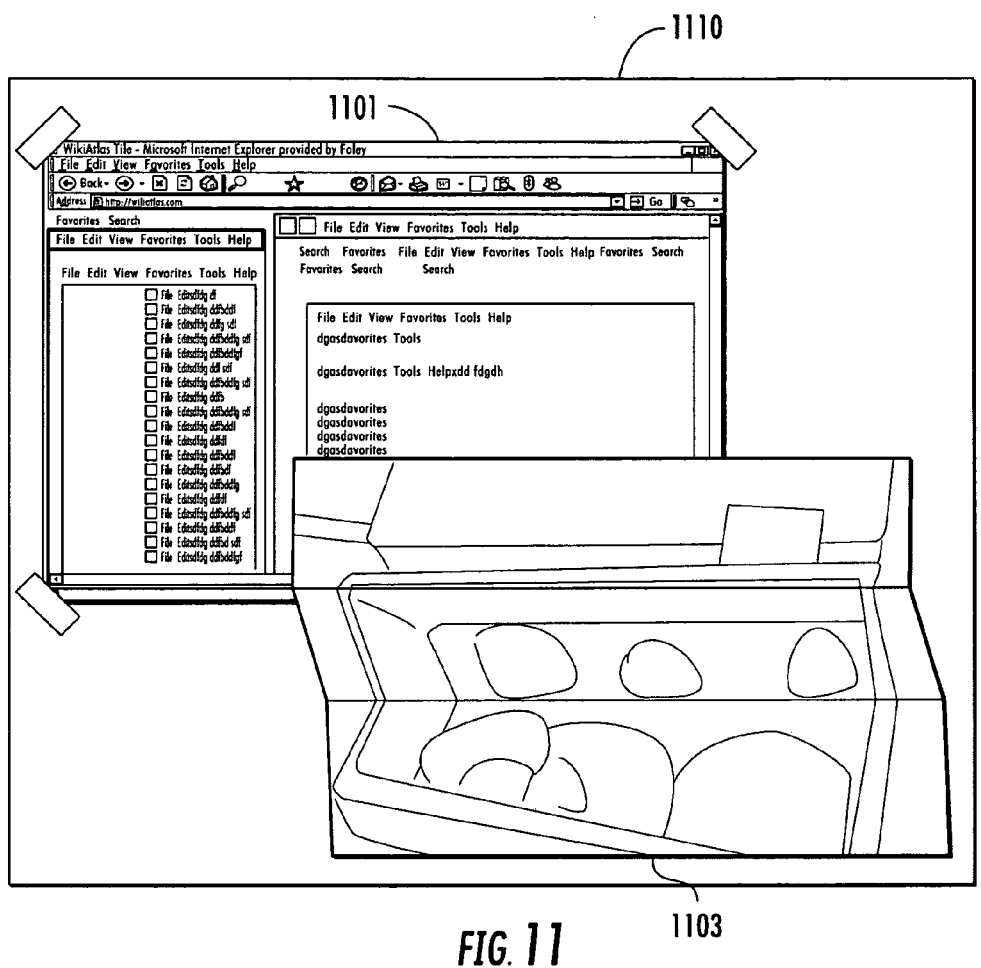
FIG. 11 illustrates a folded object, according to an embodiment of the present invention.

Pre-folded seams facilitate interactive folding at a later time. This maybe generated automatically using segmentation algorithms such as white space detection, through pre-established folds associated with the display element, etc. Folding, as illustrated in FIG. 11, allows a user to view more information within a confined space 1110. For example, browser window 1101 is overlaid by a folded version of object 1103 which includes other information. This folded object may be placed over convenient boundaries of other objects, again separating most immediate to more peripheral content. This placement may be interactive by explicit user movement of the objects or maybe automatically placed, for example by segmentation, structural boundaries in the content, or a semi-automated approach such as "snap-to content" or "snap-to frame." Additionally, an object may have multiple folds.

Figure 11B:
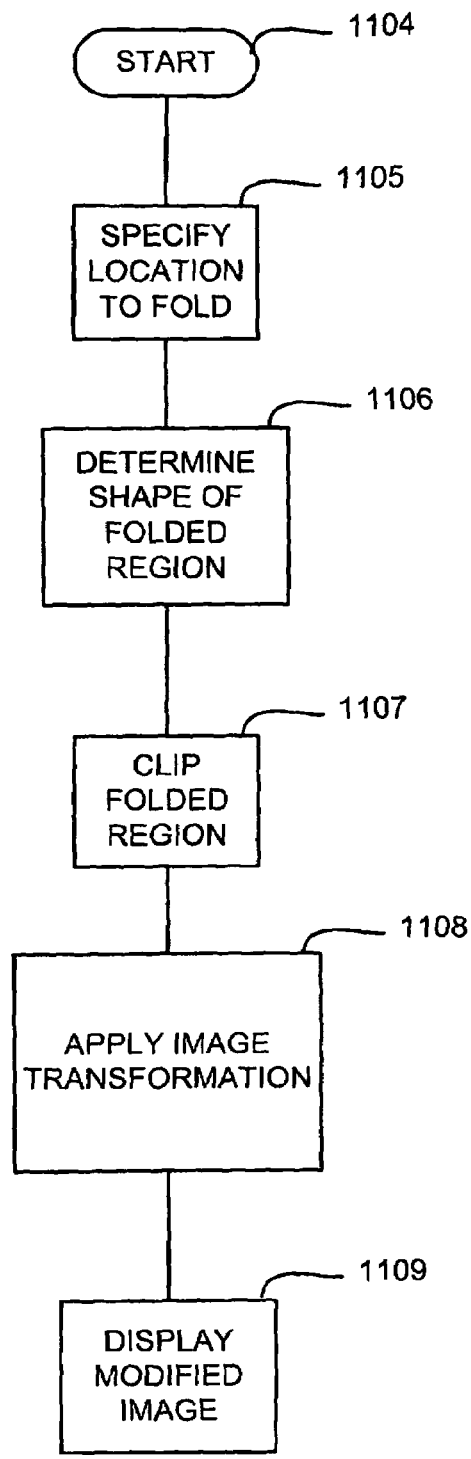
FIG. 11B is a flow chart illustrating the steps for folding an object, according to an embodiment of the present invention.

FIG. 11B illustrates a method for performing the steps of folding an image, according to an embodiment of the present invention. The method begins at step 1104 where, in response to a user action, the method begins. Control is passed to logic box 1105 where the user specifies the location of where the fold is to begin. Once the fold location has been determined, control is passed to logic box 1106 where in response to a folding action, described below, a determination is made of the shape of the folded region. In logic box 1107, the folded region is clipped along a boundary of the folding so that the display only represents the top portion of the object being folded. In logic box 1108, an image transformation such as rectangular distortion, stretching and/or compression in at least one dimension, skewing by function determined by the folding extent (e.g., angular rotation), edge detection and enhancement, and shadow generation, is performed on the displayable portion of the folded object. In logic box 1109, the transformed image is displayed on a display screen.

User interactions that accommodate folded edge specification include dragging a mouse or other pointing input device along a path, clicking a mouse or other pointing input device at predefined or user-selected fold points, selection of a folded material (that then acts as a visual mask or template for the display element), selection of a segmentation algorithm such as white space detection that specifies a fold, and selection from a set of predefined or randomly-generated folds.

Extending Objects Beyond the Display Area

Figure 12A:
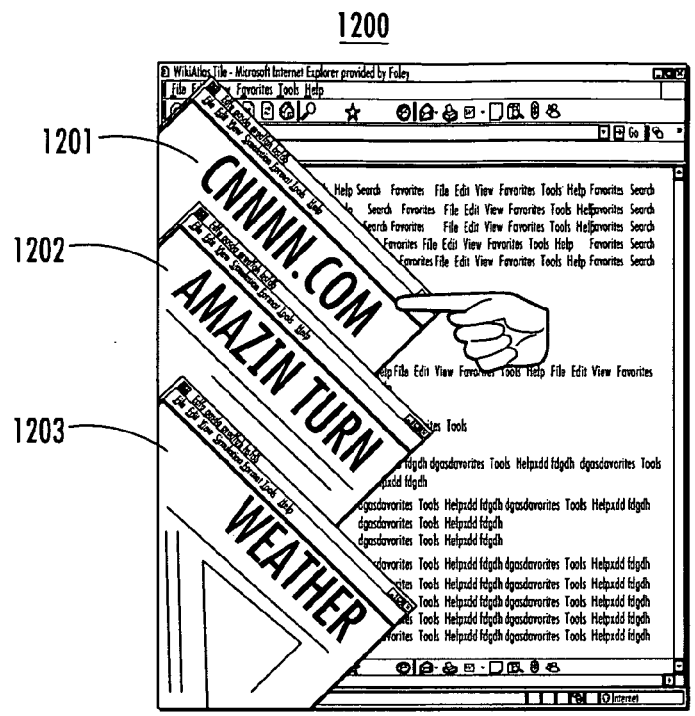
FIGS. 12A-12B illustrate objects which extend beyond the display area, according to an embodiment of the present invention.
Figure 12B:
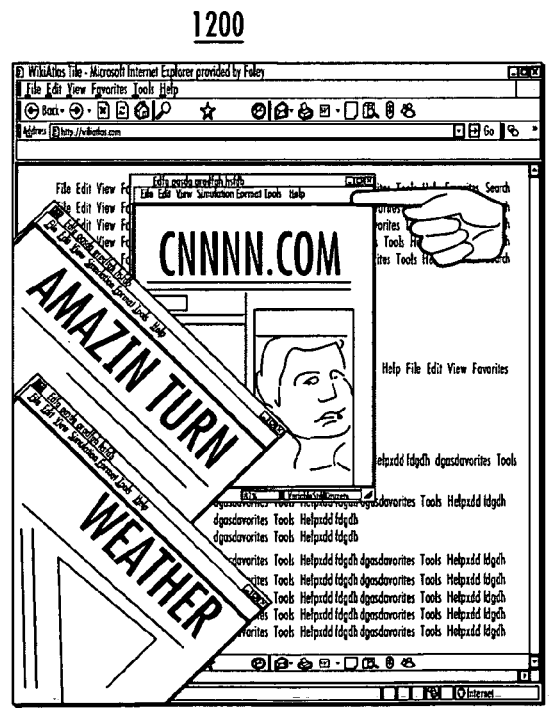

FIGS. 12A and 12B illustrate examples of an embodiment of the present invention which allows for objects to be extended beyond the display area 1200. For example, in FIG. 12A objects 1201, 1202 and 1203 may be angled at a position where a portion of each object is outside of the viewing area 1200. Viewing these objects 1201, 1202 and 1203 may be accomplished by moving the display view, for example pan and zoom, or moving the object into view, as illustrated in FIG. 12B.

Various interactions may be made to facilitate these changes of view. In an embodiment, an interaction point is included on each partially-viewed object that, when activated, will bring that object permanently or temporarily into view. For example, touching the corner of a clipped object may move it into view or change the display view by automatically initiating the appropriate pan and/or zoom.

Figure 13A:
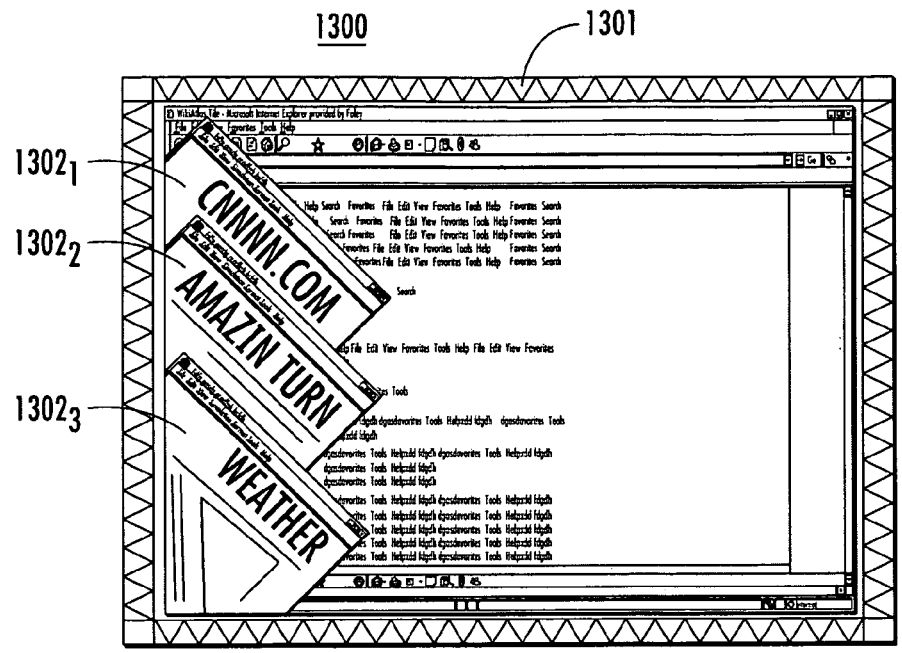
FIGS. 13A-13B illustrate a display object with an active border, according to an embodiment of the present invention.
Figure 13B:
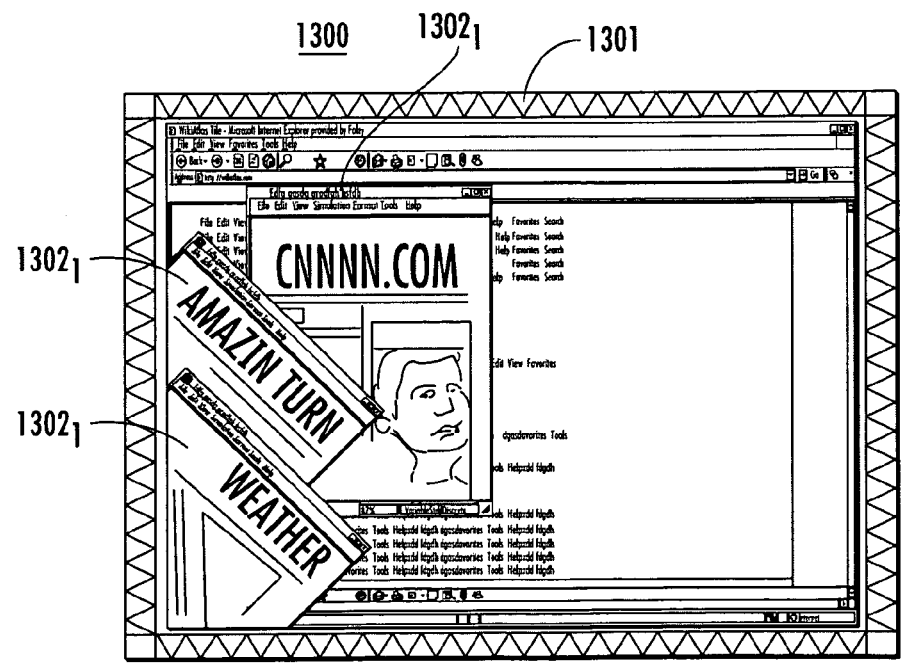

Another embodiment provides an active border region 1301 around display area 1300, as illustrated in FIGS. 13A and 13B. The frame 1301 could have buttons, touch or heat sensitivity, or other biometric measures of contact. Alternatively, the border could be a small strip of the display screen itself, e.g. one row/column of pixels. Activating a portion of the region 1301 results in an object 1302$_n$ which is partially off the display area 1300 to be brought entirely into view, as illustrated in FIG. 13B.

Posting on Irregular Surfaces

Figure 14:
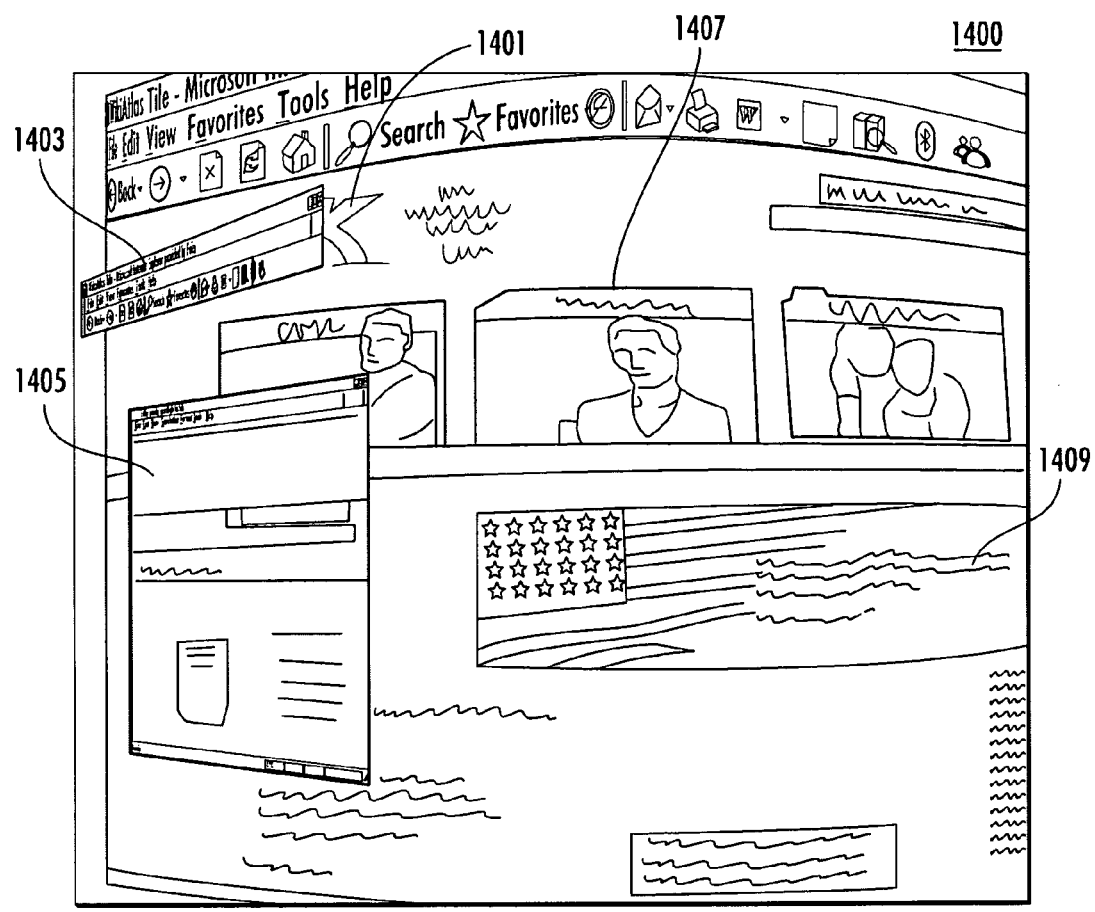
FIG. 14 illustrates posting on an irregular surface, according to an embodiment of the present invention.

Not only can the geometry of individual objects be altered or changed, the underlying posting surface 1400 (equivalent to a computer's desktop background) can also be changed, as illustrated in FIG. 14. This includes graphically curving the display surface 1400 at multi-level surfaces or otherwise modifying the surface's display. Curving display surface 1400 would thus give shadows and views underneath to some display objects 1403, 1405, but not others 1407, 1409, as illustrated in FIG. 14.

Further, as layers of objects are stacked, as illustrated in FIG. 14, a complex of geometric relationships is built up that gives glimpses of underlying materials 1401 and permits various kinds of actions on the stacked materials. For example, the following relationships and actions may be applied according to an embodiment of the present invention: select one object from underneath and it moves all objects above; objects resting on top of one another may be spun to re-orient each object at new angles.

Other configurations may also be applied to display surfaces. For example the surface may represent a top-down view of a hill. Objects displayed at the top of the hill would appear closer than objects displayed at the bottom of the hill.

Affixing Objects to Display Surfaces Using Attachments

Figure 15:
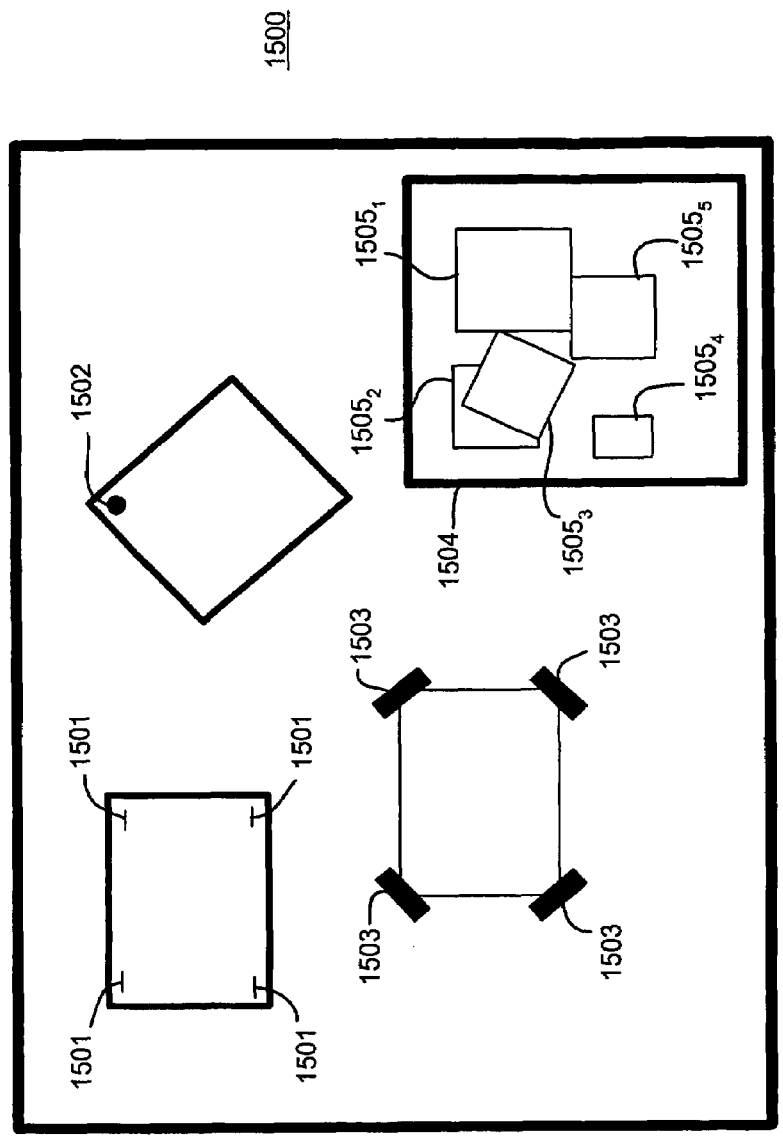
FIG. 15 is a block diagram of examples of techniques for attaching an object, according to an embodiment of the present invention.

Objects may be put into place in various ways that express persistence of display and ease of access. For example, as illustrated in FIG. 15, affixing an object with digital "staples" 1501 implies a certain permanence and each of these staples must be removed by a user to fully access the object. Digital "Push-pins" 1502 are designed like easily replaceable staples. Digital "Tape" 1503 is removable (depending on the type of tape used) and it also has the property that the object may be taped to another object, thereby creating a group of objects that may be moved as a unit. Digital "Glue" is a permanent version of tape and is not visible in outer appearance. Digital "Holders" 1504 may be attached to the information space so that it fully or partially constrains the motion of display objects 1505$n$ that are placed in the holder 1503 and thereby creates a group of objects.

A Push-pin 1502 is a common digital desktop object, and therefore will not be described in further detail. For example, Push-pins are used in the Open Look Virtual Window Manager.

According to an embodiment of the present invention, digital glue exhibits at least the following characteristics and capabilities: glue may be associated (for example, as in the spreading motion with a mouse) at various points on an object, including an underlying posting surface. This anchors any part or whole of the display element depending on the extent of the applying motion. Glue may be given a lifetime such as the short-lived stickiness of paper Post-it™ notes, or the permanence of cement. Digital glue may be removed with digital glue remover, for example as in the spreading motion with a mouse.

Use of digital tape 1503, according to an embodiment of the present invention, exhibits at least the following characteristics and capabilities: tape may be associated, for example, in a spreading motion with the mouse at various points on an object. This anchors a corner or an edge depending on the extent of the applying motion. Tape 1503 maybe given a lifetime such as short-lived stickiness of masking tape, or the permanence of strapping tape. Tape 1503 may also be removed, for example as in a pulling motion with the mouse.

According to an embodiment of the present invention, digital staples 1501, as referred to herein, exhibit at least the following characteristics and capabilities: staples 1501 may be associated, for example as in a clicking motion with the mouse, at various points on an object. Staples 1501 may also be removed, as in a pulling motion with the mouse.

Digital holders 1504, according to an embodiment of the invention, exhibit at least the following characteristics and capabilities: holders 1504 maybe associated, for example as in a clicking motion with a mouse, at various points on a display surface 1500. Holders 1504 allow other display objects 1505$_n$ to be associated with this location, for example by placing objects $1505_n$ in the holder 1500 or otherwise associating an object $1505_n$ with holder 1504. Objects $1505_n$ within holder 1504 may be held rigid or have degrees of freedom of motion.

Each of the attachment tools (e.g.: holder, staples, pushpins, tape, etc.) may be available for user selection by use of a variety of sources. For example, attachments may be selectable from menu, toolbar, keyboard shortcuts, etc.

Placement of Attachment

Attachment of display objects in a GUI according to an embodiment of the present invention may happen in a variety of ways. Where a display object gets attached determines the kinds of direct manipulation that may most easily be applied to the object. For example, objects may be attached at a corner, at a point along the edge, at an interior point, at multiple points, continuously along an edge, throughout a specified region, any combination of the above, or across the entire object.

The degree of freedom of interaction is constrained at the point of attachment according to a predefined set of rules. For example, if an object is attached at one corner, lifting, folding, etc. may occur at the far corners of the object.

In an embodiment, the location of attachments has a corresponding effect on the object being attached. For example, an object with one Push-pin at a corner will hang at an angle (calculated based on a center of gravity of the object) and can be rotated by the user around the Push-pin. In another example, objects attached with tape or staples cannot be rotated but can be lifted unless all corners have been attached.

Objects may be attached to the display surface or to another object. The attachment may imply an inheritance of configuration from the object to which it is attached. For example, if an object is attached to a bulging surface, that object may assume the characteristics of the bulge when it is displayed to the user.

Objects may also be layered in a manner that occludes mostly white space and lower objects. This may be accomplished by direct manipulation, by assisted manipulation, or automatically. Automatic placement determines where objects may be tiled by the determining characteristics of underlying objects. Structural characteristics of the information such as frame boundaries, headings, or pictures may also be used. In assisted manipulation, the same or similar automated methods may be used to provide hints, defaults, or successions of choices for the user to make about object placement.

Locked Formats

All or part of a GUI, according to an embodiment of the present invention, may be locked into place by a user. This may appear visually as a transparent frame (or holder) 1504 over the locked area or the locking may be implicit based on a state variable of the digital environment. For example, locking mechanisms maybe accessed through menus, dialogues, or other means known in the art. The frame may be unlocked by direct manipulation of a locking mechanism, e.g., drag and drop with an unlocking password or token.

It will also be understood that other methods may be applied to digital objects in addition to the ones described above. For example, other methods include combining notions of digital transparency with the opaque methods described above, and suspending physical laws temporarily, such as being able to reach through objects to manipulate things underneath, without affecting other objects.

Representation of Interaction Functions

Representations may be utilized for invoking the interaction functions described above. These representations are designed to suggest to a user a direct manipulation which may be performed on an object. Such representations of actions that may be applied include, but are not limited to, suggestive cursors, suggestive object boundaries, action markers, etc.

Figure 16:
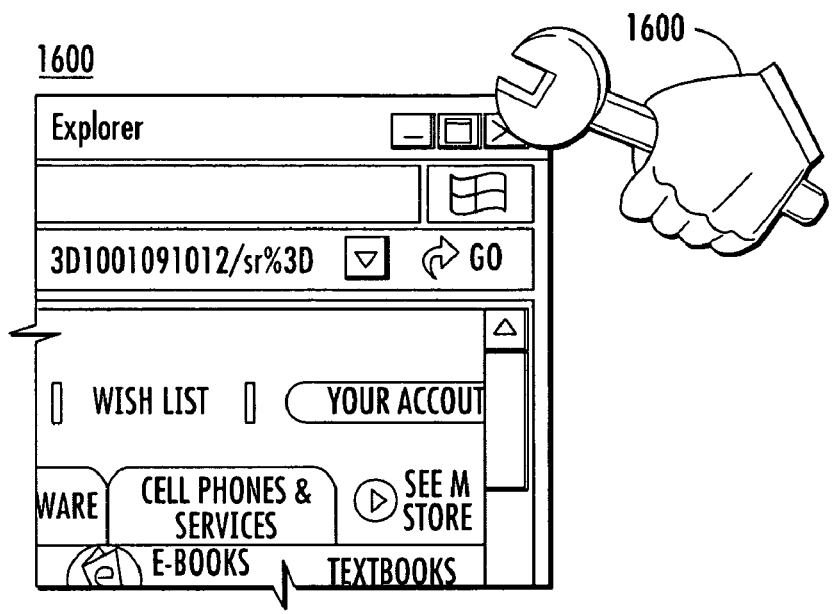
FIG. 16 illustrates an example of a suggestive cursor, according to an embodiment of the present invention; and, FIG. 17 illustrates an example of an action marker, according to an embodiment of the present invention.

Suggestive cursors, according to an embodiment of the present invention, may display to a user a display element illustrating the type of action that may be performed on an object. FIG. 16 illustrates a cursor 1501 of a hand holding a wrench, thereby informing the user that any motion made with a pointing device will be treated as a rotation of object 1600. The cursor appearance may be selected explicitly or implicitly.

Example cursors for the display actions described above, according to an embodiment of the invention, are illustrated in Table 1 below.

TABLE 1

| Action | Example Cursor |
| --- | --- |
| Creating irregular edges | Scissors, Exacto knife, hands ripping paper, pictorial view of type of edge (e.g., ripped) |
| Restoring regular edges | Roller, hands smoothing paper, pictorial view of type of smooth edge |
| Selecting posting material | Pictorial view of material (e.g., paper, old, crumpled) |
| Angling display elements | Compass, hands showing direction to swing, pictorial view of angled element |
| Folding display elements | Hands folding paper, pictorial view of folded element |
| Extending display elements beyond the display area | Pictorial view of pushing element aside |
| Selecting posting surfaces | Pictorial view of surface (e.g., curved) |
| Affixing postings | Pictorial view of type of attachment or type of dispenser for attachment (e.g., tape) |
| Locking formats | Key/lock |

Suggestive object boundaries display actions that maybe performed by a user on an object. For example, ripped boundaries suggest that actions taken on them would be smoothing. A rippable boundary (i.e., one that might be ripped) may be suggested by a slight tearing of the display object frame or some small part of it, like a corner of the object. Similarly, folding may be suggested by a slightly turned up edge. Angling might be suggested by a slow, very slight swinging of the boundary.

Figure 17:
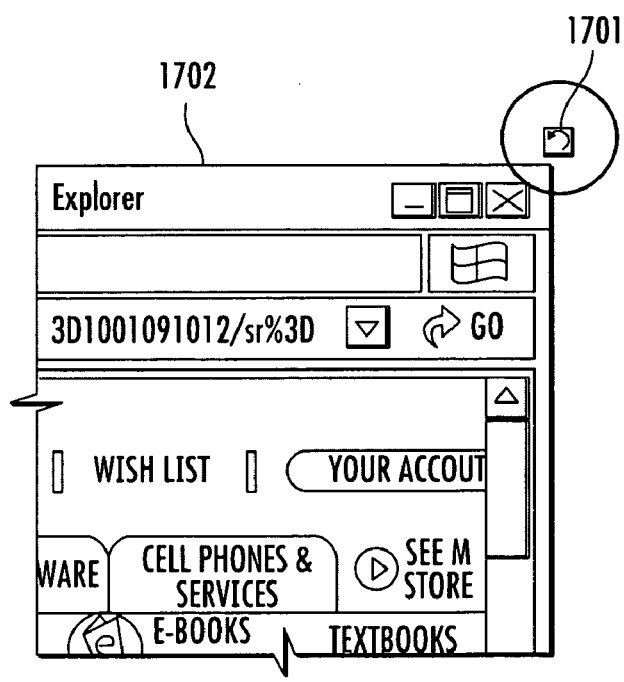

Action markers 1701 as illustrated in FIG. 17 may also be used to illustrate the type of action that may be applied to a display object 1702, according to an embodiment of the invention. The examples given in Table 1 above may be used to describe action markers appropriate for the display actions described previously.

Digital Material Processing

As mentioned above, display objects may be associated with different material properties. These properties include, but are not limited to, the level of transparency (opaque to invisible), deformability (cut, fold, tear, buckle, etc.), layout (default orientation, shape, edge, type, etc.).

For a given display object, the user may create, copy or modify the object with respect to its material properties. The properties associated with a material are stored and associated with a display object. Properties may be changed, for example by tool bar or menu selections, dialogue or direct manipulation.

According to an embodiment of the invention, a set of behaviors are executed whenever a display object with a given material is active, as described above. For example, if an object is assigned a material of metal, the object maybe bent, folded etc.

External Interaction Management

In addition to actions performed by direct user manipulation, other types of processing include simulation programs or autonomous agents such as a breeze simulation that subtly moves display objects, thereby fostering a peripheral awareness of display content. Process timed events such as expiring display objects constructed with short-lived materials, and process-triggered actions such as in response to a system or network event may also be included in embodiments of the present invention.

For example, in an embodiment a display object may, over time, become yellow, appear crumpled, and eventually fall off of a display surface. In another example, the appearance of a display object may change when posted on a particular display surface. For example, the object may become a little larger, a little crumpled, change color, etc.

Implementations

As noted above, different implementations may be utilized to perform the above embodiments of the present invention. For example, the graphical toolkit of an existing GUI may be modified, thereby re-implementing the GUI to perform the above manipulations. An alternative implementation overlays an embodiment of the present invention over an existing GUI and thereby generating the above effects. Still further, embodiments of the present invention may be implemented as a Standalone application that runs within current GUI environments. Each of these implementations will be described in further detail below.

Modifying an Existing GUI Toolkit

Two approaches to re-implementation of GUI display elements (e.g., components, widgets, etc.) are to modify the basic component definitions of the toolkit or define new programming elements in the toolkit that transform the basic elements. GUI definitions have one or more definitions of displayable objects. For example, the application programming interface for the Java Abstract Window Toolkit defines a base component class ("Component"), that specifies objects "having a graphical representation that can be displayed on the screen and that can interact with the user." The basic Component object defines a number of visible attributes for an object, such as the X alignment, Y alignment, background, color, etc.

In an embodiment, the toolkit is modified to allow all types of shapes to be applied to a displayed object, not just square or rectangular. These shapes include, but are not limited to, clipping a display object along a line or curve, applying multiple clipping transformations to an object, and applying clipping transformations after other transformations (e.g., image transformations described below).

Additionally, an existing GUI may be modified to allow clipping transformations and image transformations in response to user events or user actions (e.g., specifications of folding, swinging, tearing, bending, etc.). Different mechanisms for user input are described above (e.g., menu selection, pointing device gestures, button controls).

Transformations maybe performed by including a library of specific transformations and combination of transformations (e.g., distortion emanating from a line or curve; distortion of a given width along a line or curve; wave function applied across a surface from a point or set of points of origin; shadowing from a nearby display element from a point of illumination; and bulging or curving an image from an interior point or set of points). Further, for any Components capable of containing other components in a related collection (e.g., Java AWT Container objects), the above transformations may be propagated from the containing objects to subordinate objects in the coordinate system of the containing object. The attributes controlling the transformations (e.g., points of origin, reference lines or curves, etc.) maybe projected onto the coordinate system of the subordinated components using a simple restriction of the attributes to the coordinate system of the subordinate component.

Alternatively, the basic Component definition may be modified (e.g., changed or subclassed) by providing the functionality for clipping and image processing needed to produce the specific effects (tearing, bending, etc.) as attributes and behaviors of the Component itself.

In still another embodiment, a new class of objects maybe created, for example TransformedComponents, that represent clipped and image processed equivalents of corresponding Components (e.g., somewhat equivalent to 'peer' elements). The TransformedComponents are rendered on a display screen and the equivalent Components are not displayed (they may be rendered off-screen, or virtually). User events are passed from the TransformedComponents, through an inverse transformations to the Components for processing. System events acting on the Components are passed to the TransformedComponents for rendering, through related transformations.

Direct manipulation of display objects using selectable control widgets such as Java AWT Button Components or other clickable or draggable Components may also be implemented in various embodiments by defining the Component class that represents the manipulation handle (e.g., by subclassing buttons or other selection components or by creating a new Component from scratch). This manipulation Component is associated with the display objects that are capable of containing other components in a related collection (e.g., Java AWT Container objects that include subordinate components through the 'add' method).

Layering on an Existing GUI Environment

In another embodiment, the invention maybe constructed in manner that requires no change to an existing underlying display object architecture. A display object that is manipulated into a non-regular orientation (e.g., tilted, folded, etc.) may be represented by an iconic version of itself that has been transformed according to any of the techniques described above. The actual display object is rendered off-screen or virtually and the transformed iconic version is rendered on-screen.

Changes that occur to the underlying display object are propagated to the iconic version at a predetermined time interval or upon the occurrence of a change to one of the objects. For example, the underlying object either monitors itself for changes and updates (re-renders) the iconic version, or a separate application may monitor the transformed display objects for changes and re-render the iconic versions.

Any user action taken on the iconic version is propagated to the underlying display object. This propagation may occur using the inverse transformations that were applied to generate the iconic version. Alternatively, any user actions on the iconic version may cause it to be replaced by the underlying representation (in effect temporarily or permanently swapping the underlying object on-screen and the iconic version off-screen).

Creating a Standalone Application

In still another embodiment, the techniques described above maybe implemented in a stand alone application. All objects are represented through internal structures within the application in the manner described above. As the internal structures are under the complete control of the application they are not subject to constraints placed by the GUI environment of existing GUIs. Each display objects and its functionality is fully implemented within the application (e.g., if there is a browser display object, the complete implementation of the browser will be included in the application, along with all the transformation functions described above.

Although headings have been used in this description, they are to serve as a guide to the reader only and should not be construed to limit the invention.

It should be understood that the particular embodiments described above are only illustrative of the principles of the present invention, and various modifications could be made by those skilled in the art without departing from the scope and spirit of the invention. Thus, the scope of the present invention is limited only by the claims that follow.

The invention claimed is:

1. A computer-implemented method for transforming the visual appearance of a graphical image on a graphic user interface, comprising the steps of:
generating the graphical image within a confined display area by way of an electronic display device wherein the graphical image represents a window displayed on the display area;
associating a physical material with said graphical image, said physical material defining possible transformations to said graphical image according to at least one physical irregularity associated with said physical material that includes one or more of the following: wood, metal, paper or glass;
receiving an input;
transforming the visual appearance of said graphical image, responsive to said input and in accordance with the possible transformations defined by the physical material, in a non-uniform manner, to have an appearance of the physical irregularity associated with the physical material, wherein the graphical image is transformed to have the appearance of at least one physical irregularity selected from the group of wood, metal, paper, or glass, and wherein the transformed graphical image is non-uniform with respect to other graphical objects on the display area; and,
displaying said non-uniform graphical image on the graphic user interface.

2. The method of claim 1, further comprising transforming said graphical image to appear torn, wherein said torn appearance includes at least one ragged segment of said graphical image.

3. The method of claim 1, further comprising transforming said graphical image to appear bent.

4. The method of claim 1, further comprising transforming said graphical image to appear folded.

5. The method of claim 1, further comprising edge detection and transforming said graphical image to appear warped.

6. The method of claim 1, further comprising:
transforming said graphical image so that the appearance of the at least one physical irregularity is a clipped appearance, wherein said clipped appearance further comprises a variety of shape definitions.

7. The method of claim 1, further comprising the steps of:
monitoring said displayed non-uniform graphical image for a second input;
generating a second graphical image responsive to said second input;
transforming said second graphical image;
removing said non-uniform graphical image; and
displaying said second non-uniform graphical image in response to said step of removing.

8. The method of claim 1, further comprising:
altering the displayed appearance of an underlying posting surface on top of which said graphical image is rendered, wherein the altering of said underlying posting surface adds an appearance of shadows and/or views to said graphical image.

9. The method of claim 1, wherein the physical material specifies at least one of the following: level of transparency of said graphical image, deformability of said graphical image, and layout of said graphical image.

10. The method of claim 1, further comprising:
gradually over time, altering the appearance of said graphical image to expire as part of a process timed event.

11. The method of claim 1, further comprising:
layering the transformations on top of an existing graphical user interface (GUI) by representing a existing display object of said GUI with an iconic version that has been transformed according to said input, wherein the iconic version is rendered on-screen and the actual display object is rendered off-screen.

12. A computer-readable storage medium storing one or more sequences of executable instructions for transforming the visual appearance of a graphical image on a graphical user interface comprising the steps of:
receiving an input comprised in a first graphical image, wherein the first graphical image represents a window displayed on the graphical user interface;
associating a physical material with said graphical image, said physical material defining possible transformations to said graphical image according to at least one physical irregularity associated with said physical material that includes one or more of the following: wood, metal, paper or glass;
generating a second graphical image responsive to said input by transforming the first graphical image in accordance with the possible transformations defined by the physical material and in a non-uniform manner to have an appearance of at least one physical irregularity associated with the physical material, wherein the first graphical image is transformed to have the appearance of at least one physical irregularity selected from the group of wood, metal, paper, or glass, and wherein the transformed graphical image is non-uniform with respect to other graphical objects on the display area;
removing from the graphic user interface said first graphical image; and,
displaying said second graphical image responsive to said step of removing.

13. The computer-readable storage medium of claim 12, further comprising the step of:
monitoring said first graphical image for an input; and
wherein said step of receiving an input comprises receiving an input from said first graphical image.

14. The computer-readable storage medium of claim 12, wherein transforming the graphical image further includes:
assigning a digital attachment characteristic to said graphical image, wherein said digital attachment characteristic is used to digitally attach said graphical image to said graphical user interface.

15. The computer-readable storage medium of claim 14, wherein said digital attachment characteristic is selected from the group consisting of:

digital staples, digital tape, digital push-pins, and digital glue.

16. The computer-readable storage medium of claim 14, wherein a degree of freedom of interaction with said graphical image is constrained at a point of attachment according to a predefined set of rules.

17. The method of claim 1, wherein transforming the graphical image further includes:

assigning a digital attachment characteristic to said graphical image, wherein said digital attachment characteristic is used to digitally attach said graphical image to said graphic user interface.

18. The method of claim 17, wherein said digital attachment characteristic is selected from the group consisting of:

digital staples, digital tape, digital push-pins, and digital glue.

19. The method of claim 17, wherein a degree of freedom of interaction with said graphical image is constrained at a point of attachment according to a predefined set of rules.

20. A method for transforming visual appearance of a graphical image on a graphic user interface, comprising the steps of:

generating the graphical image within a confined display area by way of an electronic display device wherein the graphical image represents a window displayed on the display area;

associating a physical material with said graphical image, said physical material defining possible transformations to said graphical image according to at least one physical irregularity associated with said physical material that includes one or more of the following: wood, metal, paper or glass;

receiving an input;

transforming the visual appearance of said graphical image, responsive to said input and in accordance with the possible transformations defined by the physical material, in a non-uniform manner, to have a torn appearance, wherein the torn appearance includes at least one ragged segment of said graphical image, and wherein the torn appearance is applicable to paper type only; and displaying said non-uniform graphical image on the graphic user interface.

* * * * *

UNITED STATES PATENT AND TRADEMARK OFFICE
CERTIFICATE OF CORRECTION

PATENT NO. : 7,610,563 B2 Page 1 of 1
APPLICATION NO. : 10/104081
DATED : October 27, 2009
INVENTOR(S) : Nelson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 390 days.

Signed and Sealed this

Twelfth Day of October, 2010

David J. Kappos
*Director of the United States Patent and Trademark Office*